April 12, 1966  R. MORONI ETAL  3,246,059
PROCESS FOR THE PREPARATION OF FORM PRESSED
PARTS OF LIGHT SPECIFIC GRAVITY FROM
FOAMED SYNTHETIC PLASTICS
Filed Oct. 8, 1962  2 Sheets-Sheet 1
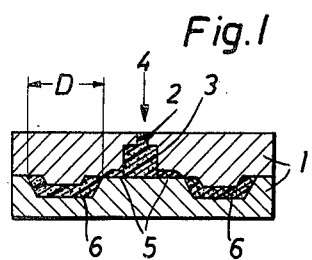
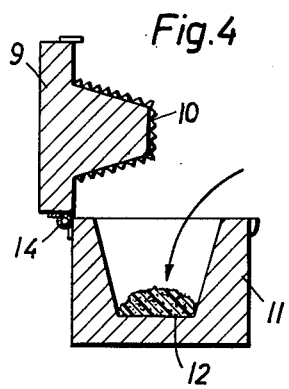
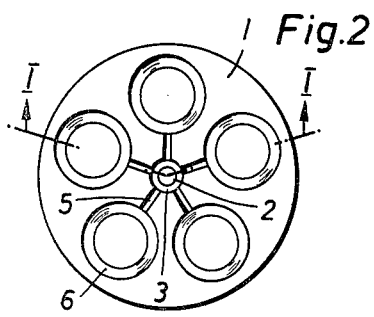
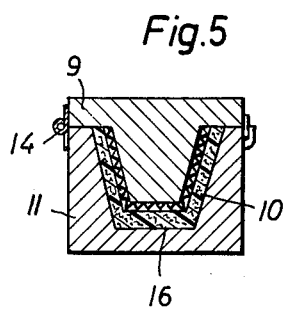
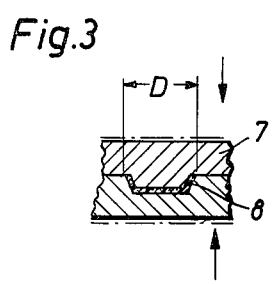
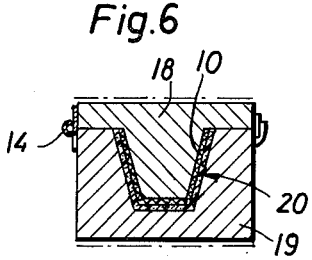
INVENTORS
Rolf Moroni & Peter Kiolensiek
BY
Philip D. Golrick
ATTY.

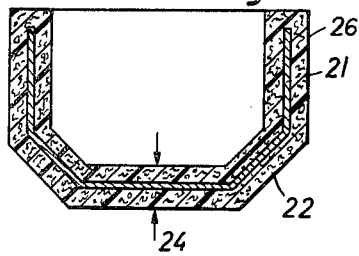
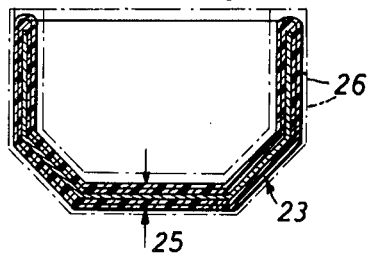
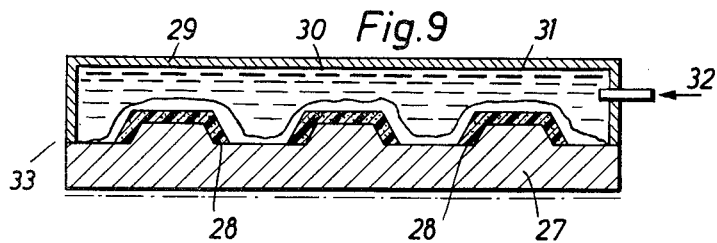
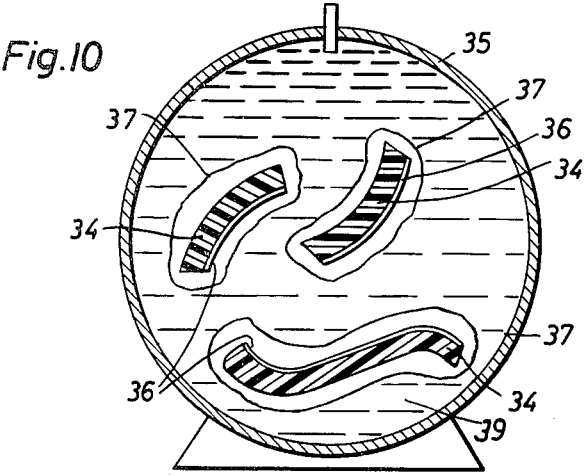

United States Patent Office 3,246,059
Patented Apr. 12, 1966

3,246,059
PROCESS FOR THE PREPARATION OF FORM PRESSED PARTS OF LIGHT SPECIFIC GRAVITY FROM FOAMED SYNTHETIC PLASTICS
Rolf Moroni, Hersel, near Bonn, and Peter Kisteneich, Spich, Troisdorf, Germany, assignors to Collo-Rheincollodium Köln G.m.b.H. Werk Hersel of Hersel, near Bonn, Germany
Filed Oct. 8, 1962, Ser. No. 231,055
6 Claims. (Cl. 264—48)

The present invention relates generally to the art of producing finished objects or stock for further fabrication from foamed plastics. The invention more particularly is concerned with a process for the preparation of light form-pressed parts having a specific gravity or a density of about 0.2–0.9 from foamable synthetic plastics.

Specifically the invention is concerned with a process in which a mixture of reactive components is prefoamed in a preform and the preformed object is then placed in a final or finishing form or mold before completion of the linking or polymerizing reaction, in which final form the reaction is completed, as well the forming of the object is carried out with utilization of the heat of reaction and a simultaneous densification or compression.

In known processes for working of synthetic plastic foams from foamable synthetic plastics, either self-hardening or hardened through heat application, in general there is sought a highest possible homogeneity of the finished synthetic plastic foam product. For attainment of this end it has already been proposed to prepare first a pre-pressed object from the synthetic plastic foam and after hardening of the foam to densify or compress the object. In this manner there is inhibited uneven shrinkage, therefore there is prepared a foamed body homogeneous throughout the cross section.

It has become evident, however, that a good homogeneity is not determinative for technically good or suitable characteristics of the densified foam. For many finish parts of densified foams, it is essential that they exhibit an excellent surface hardness, a good form stability and a not too high elasticity. These factors, decisive for technical applications, as well as low specific gravity can be attained together if the foam preparation and the subsequent densification are carried out by a process in accordance with the invention, in which therefore the formation of a particularly dense surface is striven for on an inhomogeneous foamed body.

According to the invention this problem is solved by prefoaming the foamable synthetic plastic mixture at a form temperature of 0–15° C. and under a slightly elevated internal pressure of 0.1–1 kg./cm.$^2$, and thereafter compressing to about ½ to ⅕ of the volume without application of heat.

Essentially for attainment of the inhomogeneous structure, the prefoaming is carried out at a form temperature of from 0° to, at the highest, 15° C., the lower temperature boundary being limited according to the economics of the finishing.

The use of a form temperature of from 8–12° C. has proved itself most favorable in economic and technical respects. Conducive in the same respects is the further expedient, namely, the use of an internal pressure between 0.1–1 kg./cm.$^2$, since it has been demonstrated, that at higher internal pressures the course of the reaction is far slower. To this end, the prefoaming is undertaken in a closed form or mold the volume of which is less than that of the foamed body otherwise would be after the end of the reaction, so that a certain internal pressure arises, which is relatively low and lies say between 0.1–1 kg./cm.$^2$.

The fabrication of the foam material rough part can take place through injection of the raw material mixture into an open form or mold shaped as a female or male die. In this case it is at times expedient to line the preform with re-inforcing inserts or embedments such as foils, webs, fleeces, perforated foils, screening and so on, of textile fibers, synthetic plastic materials, paper, paperboard, glass, or the like, and/or to embed these inserts in the mass during the introduction into the form of the reactable foam material mixture, whereby the latter penetrates into and fills the interstices. In like manner, composite parts or armatures of solid, for example, metallic workpieces can be embedded.

In further elaboration of the process, foamed material-rough parts, produced by continuous foaming in the form of bars, sheets, or shaped sections, are calibrated to finished size directly subsequently between heated or cooled calendar rolls. But instead the finish-pressing can also be carried out according to the invention by the press-bolster or rubber-sack process.

Further according to the invention by keeping within a suitable temperature the operations of prefoaming and end-forming can be completely carried out in one single work operation in the same form. In the practice of this method of operation, according to a further proposal of the invention, it so proceeds that a mixture of raw material components, which would result in a specific gravity of 0.2 without pressure application, is brought into a form or mold the fillable space of which corresponds to a product specific gravity of 0.3, whereby after attainment of this density the form volume—through pressing a stamp down on or into the closed form, for example— is so diminished, that a final specific gravity of 0.8 results.

For many cases it is advantageous if the prefoaming form or mold is comprised of a material having poor heat conductivity, as for example, hardenable synthetic plastic.

*Example*

A synthetic plastic-foam material device, having a base of an isocyanate with polyester or polyether and the requisite catalyst, the expandability of which is adjusted for a specific gravity or density of 0.2, is introduced into the cavity of a mold or form cooled to 10° C., which permits an expansion of the foam only to a specific gravity or density of 0.3. After introduction of the foamable mixture into the mold and closure of the latter, the plastic foams up to fill the form completely which for each piece lasts between 10–50 seconds. Then the volume of the form is diminished through depression of the somewhat piston-like mold cover, and thereby the foam is pressed together to a higher specific gravity or a density of, for example, 0.8. The pressure necessary for compression of the foam is relatively small and can even approximate 0.1 kg./cm.$^2$. The following hardening of the foam material lasts, according to the mixture proportions of the components, 10 to 60 seconds. Thereafter the form part can be removed. The result is a foamed material body the specific gravity or density of which decreases from the skin inwardly, with a particularly hard surface layer obtained.

The drawings show detailed examples for practice of the process according to the invention, wherein:

FIG. 1 is a cross section through a five-cavity form or mold for dishes;

FIG. 2 is a plan view of the open mold;

FIG. 3 is a fragmentary section according to FIG. 1 showing the finally densified state of the pressed item;

FIG. 4 is a cross section through a press-form for the preparation of a container, in opened condition;

FIG. 5 is the same form in closed condition before the pressing;

FIG. 6 is the same form in closed state after completed pressing;

FIG. 7 is a cross section through a press-form for a large surfaced plate before the compression or densification;

FIG. 8 is a cross section through the same press-form after the densification;

FIG. 9 is a cross section of a press mold for the application of the press-bolster process;

FIG. 10 is a cross section through a press mold for use of the autoclave process.

In the example for carrying out the invention, as shown in FIGS. 1–3, there is represented a five cavity form or mold 1 for dishes in which through the supply opening 2 there is introduced into the filling space or cavity 3, the quantitatively measured, for example, fluid workable reaction mixture 4, which after closing of the inlet opening automatically is pressed through the channels 5 into the rough part cavities 6. The over-dimensioned foam material rough parts (or castings) with diameter D are laid into the press form or mold 7, heated if necessary, for example, with a like diameter D, and under compression formed or shaped to the final form 8. The total density of the final light material-pressed part can amount to 0.1–0.8 gr./cm.$^3$, wherein the density over the cross-section is constantly inhomogeneous, and decreases from outside toward inside. Moreover, there is produced for example, according to the type of usage demands, foam-material-rough castings or parts with a density of 0.08–0.65 gr./cm.$^3$.

In the form represented in FIGS. 4–6, there is carried out the preparation of a compound body from a preformed covering plate of 0.2 mm. thick glass and the foam material body. The glass insert 10 is wrapped onto the foaming mold cover 9 provided with hinges 14, and with suitable separation means provided in the under form or under mold 11, there is supplied the quantitatively dispensed foaming material reaction mixture 12, a liquid for example. Thereafter, the form cover 9 is closed and latched, so that the foam formation proceeding under foam pressure completely fills the remaining hollow space 16 provided therein. The glass insert 10, now firmly bonded with the foam rough casting is finally introduced into the after press mold 18/19 as a bonded or compound part. Therein the part 18 has the same dimension or size as 9, where there follows the after forming of the foam element with the under-form 19 heated for example, for densification and superficial sintering of the final foam body 20 as an external layering or lamination of the glass insert.

FIGS. 7–8 show the forms or molds for the preparation of a large surfaced vessel, which is made by foaming with an inner reinforcement 21, represented in generalized form, which is embedded in the foam material mass 22. The light material combination pressed part 23, which originally possessed the rough thickness 24 is diminished in the final pressing about 50% to the end thickness, so that now there is present the wall thickness 25. Furthermore the surface 26 has undergone sintering in the case of a highly heated press mold.

The press mold represented in section in FIG. 9 serves for carrying out of the press-bolster process. Here 27 indicates a mold bottom plate, heated if necessary, over which the foam material rough parts are inverted. The upper mold wall 29, which has an elastic press sheet 30, is filled with a heated fluid press medium 31. After closure and latching of the form or mold by means of latch 33, the press sheet 30 accommodates itself to the contour of the foamed material rough part or casting 28, as soon as the necessary press pressure 32 is applied to the fluid press medium 31.

FIG. 10 represents the fabrication of a foam material combination rough part 34 of desired form in a pressure container 35 which is filled with a fluid pressure medium 39 where the rough parts 34, for contour retention, lie in part upon light foil or sheet prop forms 36, and are enclosed directly in thick, elastic sacks 37. After charging of the pressure vessel at 38 with the uniformly acting fluid pressure 39 there results then the compression of the rough pieces to the desired pressed parts.

We claim:

1. A process for the preparation of light form pressed elements, having a non-porous dense surface and having a specific gravity in the range of about 0.3 to 0.9 and continually decreasing inwardly in density, from a self-foaming synthetic plastic mixture, comprising the steps of:

measuring into a confining mold as a preliminary mold device the foamable reactive mixture in an amount which would freely self-foam to a volume substantially greater than the mold form volume;

permitting the mixture to pre-foam and thereby fill the entire volume of the mold device under a slightly elevated internal pressure of about 0.1 to 1 kg./cm.$^2$ while maintaining the mold device at a temperature in the range of about 0° to 15° C. thereby to result in a preformed element; and final forming of the preformed element before completion of the polymerisation reaction of its constituents by compression, in a device serving as a finish mold, to ½ to ⅕ of the preformed element volume; the process utilizing heat of reaction without addition of heat.

2. A process as described in claim 1, wherein a said reactive mixture foamable without pressure application to a foam with specific gravity of 0.2 is introduced into the device serving as a preliminary mold in quantity resulting in a preformed element of 0.3 specific gravity; and wherein the final forming is carried out by a compression to a specific gravity of 0.8 in the finished element.

3. A process as described in claim 1, wherein a press-bolster operation is used for the compression of the preformed element to finished form.

4. A process as described in claim 1, wherein a rubber bag operation is used for the compression of the preformed element to finished form.

5. A process as described in claim 1, wherein the entire described process is carried out in one mold device variable from a volume used to form the preformed element to a smaller final volume to effect said compression and provide the finish mold form.

6. A process as described in claim 1 wherein a continuous prefoaming operation producing a foam material element, such as a bar, sheet or shaped section, is carried out under an internal pressure of about 0.1 to 1 kg./cm.$^2$ in preforming apparatus held at the 0° to 15° C. temperature range, and said element is directly passed to and immediately calibrated to finished size between calendering rolls of controlled temperature.

References Cited by the Examiner

UNITED STATES PATENTS

| | | | |
|---|---|---|---|
| 2,384,387 | 9/1945 | Meyer | 264—321 |
| 2,394,122 | 2/1946 | Urmston | 264—55 XR |
| 2,659,935 | 11/1953 | Hammon | 264—321 |
| 2,696,184 | 12/1954 | Demarest. | |
| 2,769,205 | 11/1956 | Pfleumer | 264—55 |
| 2,933,767 | 4/1960 | Vieli et al. | 264—280 |
| 2,950,221 | 8/1960 | Bauer et al. | 161—118 |
| 3,006,033 | 10/1961 | Knox | 264—54 XR |
| 3,012,283 | 12/1961 | Foster | 18—54 |
| 3,050,432 | 8/1962 | Weinbrenner et al. | 264—321 XR |
| 3,056,168 | 10/1962 | Terry | 264—54 XR |
| 3,079,641 | 3/1963 | Knox et al. | 264—54 |
| 3,099,516 | 7/1963 | Henrickson | 264—48 |
| 3,131,426 | 5/1964 | Legler | 264—54 XR |

FOREIGN PATENTS

| | | |
|---|---|---|
| 584,293 | 9/1959 | Canada. |
| 599,493 | 6/1960 | Canada. |
| 548,684 | 9/1956 | Italy. |

ALEXANDER H. BRODMERKEL, *Primary Examiner.*

MORRIS LIEBMAN, *Examiner.*

P. E. ANDERSON, *Assistant Examiner.*